(12) United States Patent
Farshidi et al.

(10) Patent No.: US 10,796,066 B1
(45) Date of Patent: Oct. 6, 2020

(54) POWER AWARE RESIZING OF CLOCK TREE INSTANCES

(71) Applicant: Cadence Design Systems, Inc., San Jose, CA (US)

(72) Inventors: Amin Farshidi, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/228,418

(22) Filed: Dec. 20, 2018

(51) Int. Cl.
*G06F 30/398* (2020.01)
*G06F 30/3312* (2020.01)
*G06F 119/06* (2020.01)
*G06F 119/12* (2020.01)

(52) U.S. Cl.
CPC ........ *G06F 30/398* (2020.01); *G06F 30/3312* (2020.01); *G06F 2119/06* (2020.01); *G06F 2119/12* (2020.01)

(58) Field of Classification Search
USPC ....................................................... 716/133
See application file for complete search history.

(56) References Cited

U.S. PATENT DOCUMENTS

| | | | | | |
|---|---|---|---|---|---|
| 5,668,732 | A | * | 9/1997 | Khouja | G06F 17/5022 702/181 |
| 2010/0031214 | A1 | * | 2/2010 | Hou | G06F 17/5072 716/119 |
| 2014/0245250 | A1 | * | 8/2014 | Hibbeler | G06F 17/5045 716/133 |
| 2014/0289685 | A1 | * | 9/2014 | Ma | G06F 30/327 716/102 |

* cited by examiner

*Primary Examiner* — Eric D Lee
(74) *Attorney, Agent, or Firm* — Schwegman Lundberg & Woessner, P.A.

(57) ABSTRACT

Aspects of the present disclosure address systems and methods for shortening clock-tree wirelength based on target offsets in connected routes. A clock tree comprising routes that interconnect a plurality of clock-tree instances is accessed from memory. A clock-tree instance is selected for evaluation. A baseline power consumption measurement corresponding to a sub-tree of the clock-tree instance with the clock-tree instance at a first size is determined. An alternative power consumption measurement corresponding to the sub-tree of the clock-tree instance with the clock-tree instance at a second size is determined. Based on determining that the baseline power consumption measurement is less than the alternative power consumption measurement, the clock-tree instance is resized according to the second size.

17 Claims, 9 Drawing Sheets

POWER AWARE RESIZING OF CLOCK TREE INSTANCES

TECHNICAL FIELD

The present disclosure generally relates to the technical field of integrated circuit design. In particular, the present disclosure addresses systems and methods for resizing clock-tree instances.

BACKGROUND

An integrated circuit (IC) layout specifies portions of various components of an IC. When the IC is to include a large number of registers, latches, flip-flops, and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of fan-out drivers (e.g., buffers or inverters). A single driver distributes the clock signal to a grouping of other drivers and/or sinks. Connectivity between a driver and its fanout is represented by a "clock net" and will be physically implemented by routed wires.

Electronic design automation (EDA) software systems commonly perform clock-tree synthesis (CTS). Conventional approaches to CTS typically include a process of resizing clock-tree instances (e.g., clock buffers, inverters, and clock gates). Traditionally, an area of a clock-tree instance is minimized during resizing while satisfying design constraints such as slew, maximum capacitance, and skew. In these traditional approaches, the area of a clock-tree instance is used as a proxy for power consumption; however, area is not an accurate proxy for power consumption because area does not account for all types of power consumption: internal power consumption, switching power dissipation, and leakage power dissipation. Clock-tree instance area also does not account for the effects on the power consumption of the other levels of the tree. As a result, traditional area-based resizing approaches often do not provide solutions that minimize overall power consumption of the clock tree.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
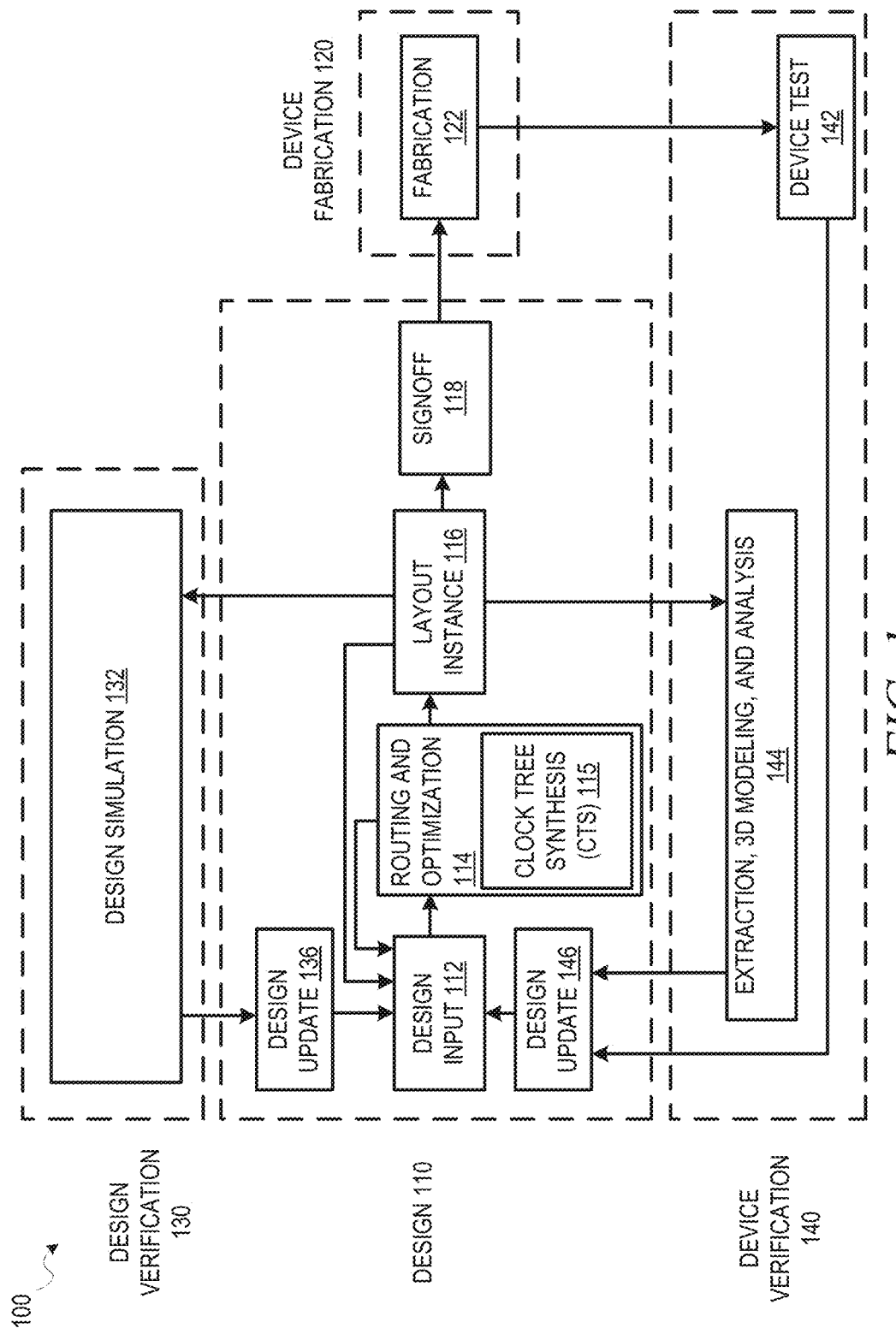
FIG. 1 is a diagram illustrating an example design process flow that includes power-aware resizing of clock-tree instances during clock tree synthesis, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional techniques for clock-tree instance resizing inaccurately use instance area as a proxy, and, as a result, these traditional techniques fail to identify resizing solutions that minimize overall sub-tree power consumption. Aspects of the present disclosure address this problem, among others, with systems and methods for power-aware resizing of clock-tree instances. The power-aware approach to clock-tree instance resizing addresses the foregoing problems with traditional resizing approaches by directly minimizing total sub-tree power consumption for a clock-tree instance being resized. That is, in resizing a clock-tree instance, the power-aware resizing approach discussed herein accounts for all components of sub-tree power consumption including internal power consumption, switching power dissipation, and leakage power dissipation.

Contrary to traditional approaches, the power-aware resizing approach allows for upsizing of clock buffers, inverters, and gates, if it results in an overall power savings, which is not possible with traditional approaches. For example, with the power-aware resizing approach, a clock-tree instance may be upsized because it provides an improvement to the data path power for a larger number of the clock sinks in the clock tree that results in an overall reduction in sub-tree power consumption, although it may result in an increase to internal power consumption. This type of power savings was not possible with traditional approaches that merely attempt to minimize area.

Consistent with some embodiments, a method may include accessing an integrated circuit design that comprises a clock tree comprising routes that interconnect a plurality of clock-tree instances. A clock-tree instance from among the plurality of clock-tree instances is selected to evaluate for resizing. Initially, the clock-tree instance is of a first size. The method further includes determining a baseline power consumption measurement corresponding to a sub-tree of the clock-tree instance based on the first size of the clock-tree instance and determining an alternative power consumption measurement corresponding to the sub-tree of the clock-tree instance based on a second size of the clock-tree instance. Both the baseline and alternative power consumption measurements are based on a combination of internal power consumption, switching power dissipation, and leakage power dissipation of the clock-tree instance sub-tree. Based on determining the alternative power consumption measurement is less than the baseline power consumption measurement, the clock-tree instance is resized according to the second size. In other words, the clock-tree instance is changed from the first size to the second size based on the second size resulting in a power consumption measurement that is lower than the baseline power consumption measurement determined based on the initial size of the clock-tree instance.

FIG. 1 is a diagram illustrating an example design process flow 100 that includes clock tree wirelength reduction based on target offsets in connected routes, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design, and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 operation, which may be performed in accordance with various embodiments described herein. The CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree generation performed as part of the CTS 115 operation includes placing clock drivers at various regions of the IC design based on satisfaction of a set of clock tree design constraints, which can include slew, latency, and power consumption by the generated clock tree. Each clock driver delivers the clock signal to a set of clock sinks and/or a set of clock drivers. A clock net of the IC design describes interconnections between a clock driver and the clock sinks and drivers that are driven by the clock driver. Any one of the clock sources, sinks, and drivers may be referred to herein as a "clock tree instance."

An initial clock tree is constructed, for example, using the Steiner-tree approach. With the Steiner-tree approach, a minimum rectilinear Steiner tree (MRST) is used for routing a multi-pin clock net with minimum wirelength. Given m points in the plane, an MRST connects all points by rectilinear lines, possibly via some extra points (called Steiner points), to achieve a minimum-wire-length tree of rectilinear edges. It shall be appreciated that the Steiner-tree approach is merely an example of the approach used to construct the initial clock tree, and in other embodiments, one of several known clock tree construction techniques may be used to construct the initial clock tree.

As will be discussed further below, the initial clock tree may be iteratively refined as part of a process of power-aware resizing of clock-tree instances. As part of this process, clock-tree instances in the clock tree are evaluated for resizing in a top down search of the clock tree. The process may begin at a root node corresponding to a clock source or at a node specified by a user. For a given clock-tree instance, a baseline power consumption measurement is determined based on an initial size of the clock-tree instance. One or more alternative power consumption measurements are determined based on one or more alternative sizes of the clock-tree instance. The lowest alternative power consumption measurement is compared with the baseline power consumption measurement, and if the lowest alternative power consumption measurement is less than the baseline power measurement, the clock-tree instance is resized according to the alternative size that corresponds to the lowest alternative power consumption measurement. Otherwise, the clock-tree instance is maintained at its initial size. The resizing process is repeated for each clock-tree instance in the clock tree.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2A-2D are conceptual diagrams that graphically illustrate a method for power-aware resizing of clock-tree instances, according to some embodiments. It will be understood that the method illustrated in FIGS. 2A-2D may be performed by a device, such as a computing device executing instructions of an EDA software system. Accordingly, FIGS. 2A-2D are described below with reference to such a computing device.

Figure 2A:
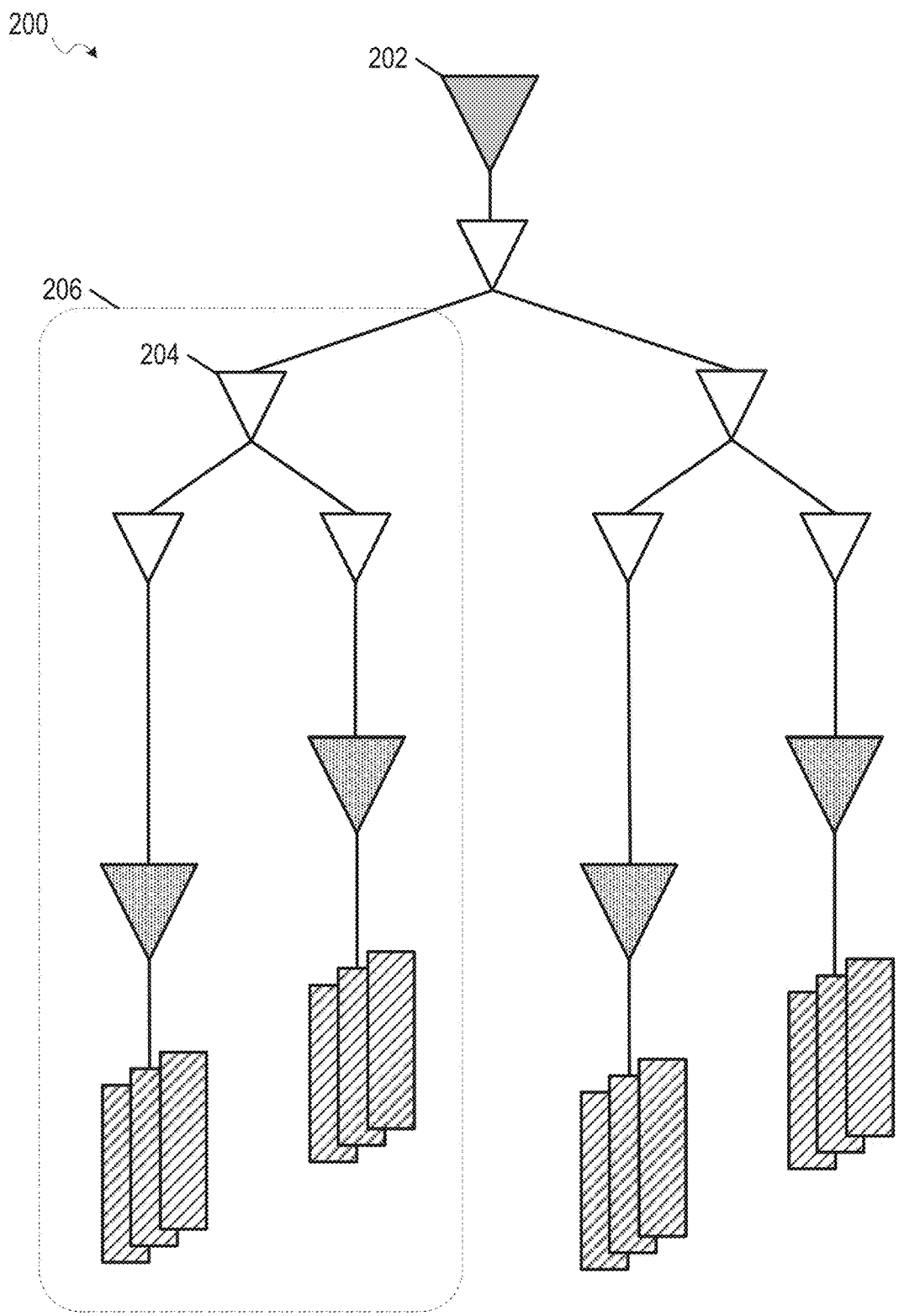
FIGS. 2A-2D are conceptual diagrams that graphically illustrate a method for power-aware resizing of clock-tree instances, according to some embodiments.

With reference to FIG. 2A, a clock tree 200 is shown. The clock tree 200 comprises multiple interconnected nodes, each of which comprises a clock-tree instance (e.g., a clock inverter, buffer, or gate). More specifically, the clock tree 200 includes a plurality of clock drivers (e.g., buffers and inverters) that deliver a clock signal from a clock-tree root node 202, which comprises a clock source of a circuit design, to a plurality of clock-tree leaf nodes, which comprises a plurality of clock-tree sinks within the circuit design.

Each clock-tree instance in the clock tree 200 is evaluated (e.g., by the computing device executing instructions of the EDA software system) for resizing based on whether the resizing results in an overall reduction to power consumption. The clock-tree instances are evaluated in a top-down search of the clock tree 200 beginning with the root node 202 or a user-specified node.

In the particular example illustrated in FIG. 2A, a clock-tree instance 204, which corresponds to a clock driver, is evaluated by the computing device for resizing. Initially, the clock-tree instance 204 is included in the clock tree 200 at a first size. In evaluating the clock-tree instance 204, the computing device determines a baseline power consumption measurement for a sub-tree 206 of the clock-tree instance 204 based on the initial size of the clock-tree instance 204. The sub-tree 206 of the clock-tree instance 204 comprises a sub-set of nodes of the clock tree 200. In particular, the sub-tree 206 includes the clock-tree instance 204 and nodes connected downstream—either directly or indirectly—to the clock-tree instance 204. The computing device determines the baseline power measurement based on internal, switching, and leakage power dissipation of the sub-tree 206 with the clock-tree instance 204 at the first size.

Although the clock-tree instance 204 is initially included in the clock tree 200 at the first size, the clock-tree instance 204 may be available in multiple alternative sizes. The computing device determines an alternative power consumption measurement for each available alternative size based on corresponding internal, switching, and leakage power dissipation of the sub-tree 206. For example, the computing device determines a first alternative power consumption measurement for the sub-tree 206 based on a second size of the clock-tree instance 204 and a second alternative power consumption measurement for the sub-tree 206 based on a third size of the clock-tree instance 204. The lowest alternative power consumption measurement (e.g., the lesser of the first and second alternative power consumption measurements) is compared with the baseline power consumption measurement, and if the lowest alternative power consumption measurement is less than the baseline power consumption measurement, the clock tree instance 204 is resized according to the alternative size that corresponds to the alternative power consumption measurement.

Figure 2B:
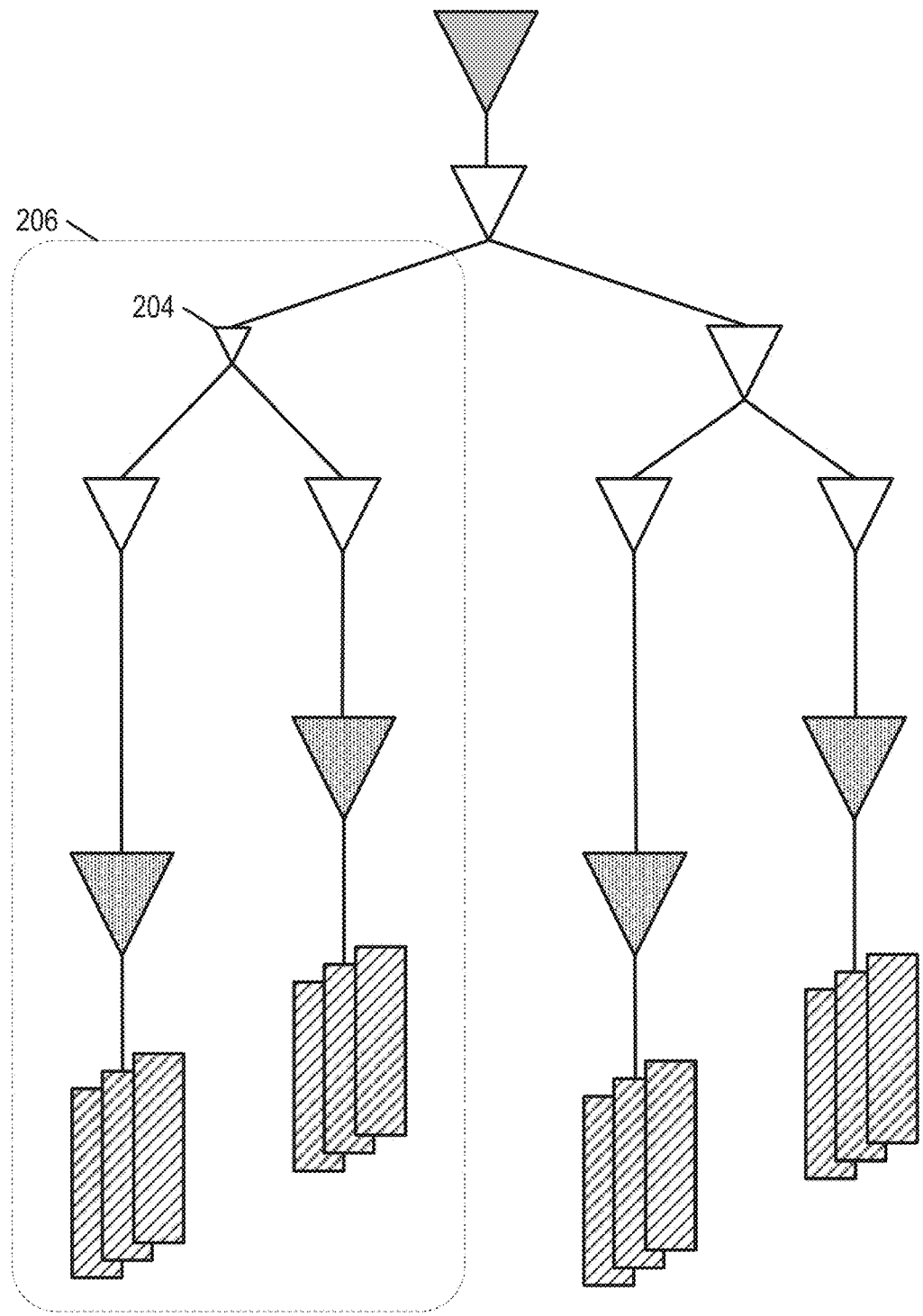

As an example, in FIG. 2B, the clock-tree instance 204 is resized according to a second size, which leads to a reduction in the power consumption of the clock tree 200. That is, the clock-tree instance 204 is changed from the first size to the second size in response to determining that a power consumption measurement associated with the second size (i.e., the lowest alternative power consumption measurement) is less than a power consumption measurement associated with the first size (i.e., the baseline power consumption measurement). As shown in FIG. 2B, the resizing of the clock-tree instance 204 includes downsizing the clock-tree instance 204.

Figure 2C:
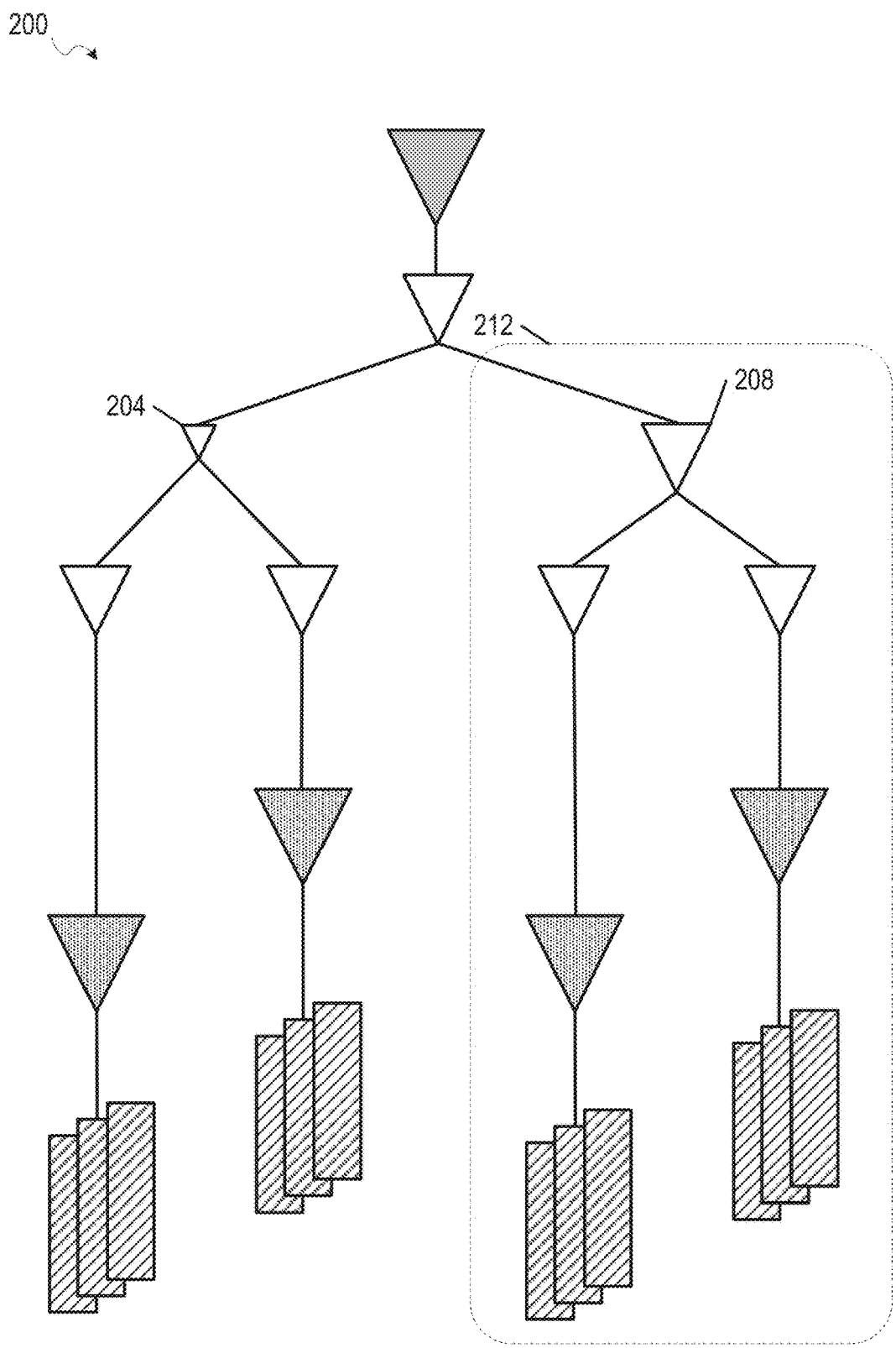

The power-aware resizing process continues in FIG. 2C where a clock-tree instance 208 is evaluated. Similar to the evaluation of clock-tree instance 204, in evaluating the clock-tree instance 208, the computing device determines a baseline power consumption measurement for a sub-tree 212 of the clock-tree instance 208 with the clock-tree instance 208 at an initial size. The computing device also determines alternative power consumption measurements for the sub-tree 212 with the clock-tree instance 208 sized at each available alternative size. The lowest alternative power consumption measurement is compared with the baseline power consumption measurement, and if the lowest alternative power consumption measurement is less than the baseline power consumption measurement, the clock-tree instance 208 is resized according to the alternative size that corresponds to the alternative power consumption measurement.

Figure 2D:
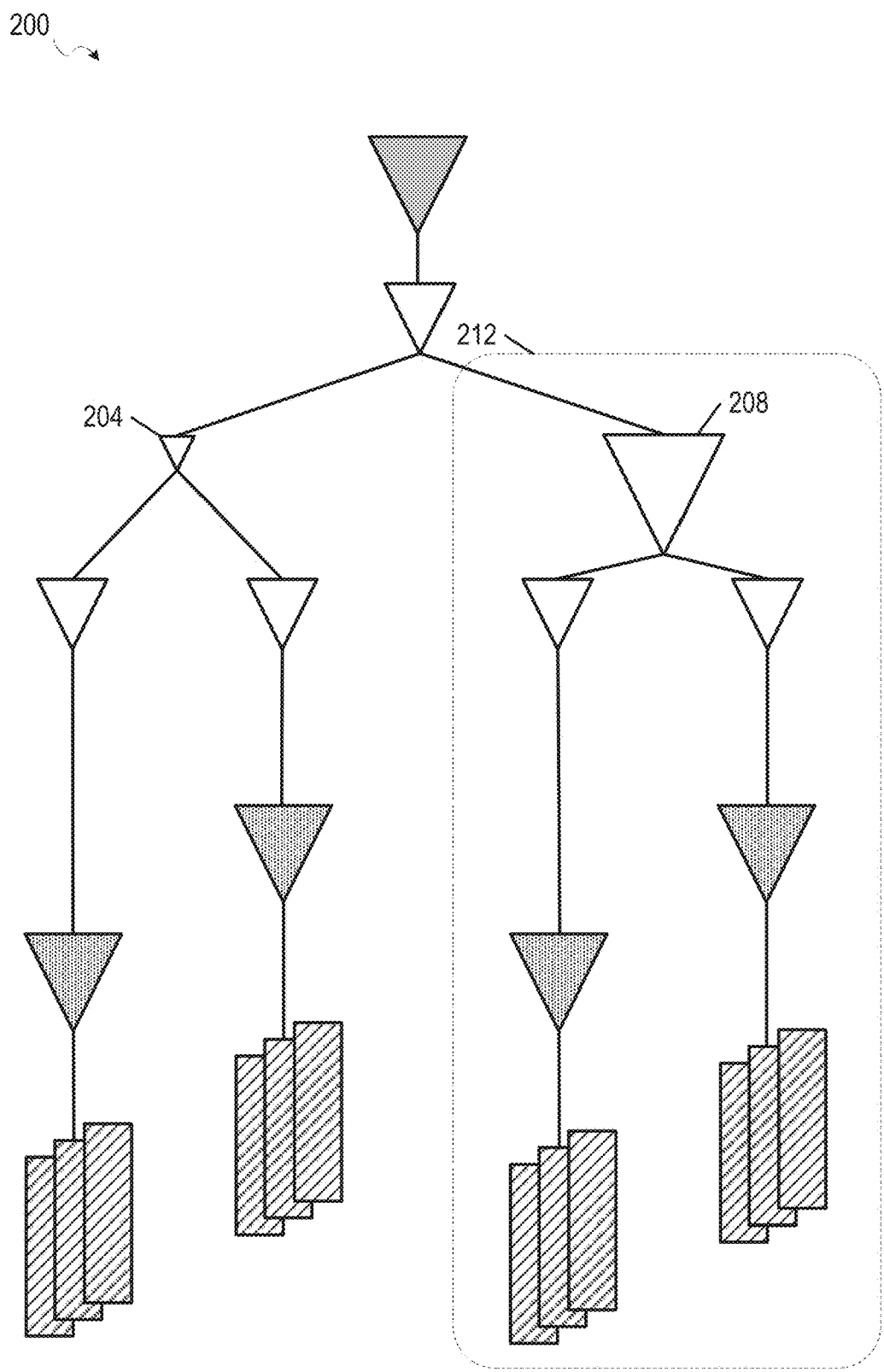

As an example, in FIG. 2D, the clock-tree instance 208 is resized according to a second size that lead to a reduction in the power consumption of the clock tree 200. That is, the clock-tree instance 204 is changed from the initial first size to the second size in response to determining that a power consumption measurement associated with the second size (i.e., the lowest alternative power consumption measurement) is less than a power consumption measurement associated with the first size (i.e., the baseline power consumption measurement). As shown in FIG. 2D, the resizing of the clock-tree instance 208 includes upsizing the clock-tree instance 208. Although not illustrated, the process described above in reference to clock-tree instances 204 and 208 may be repeated for each node in the clock tree 200.

Figure 3:
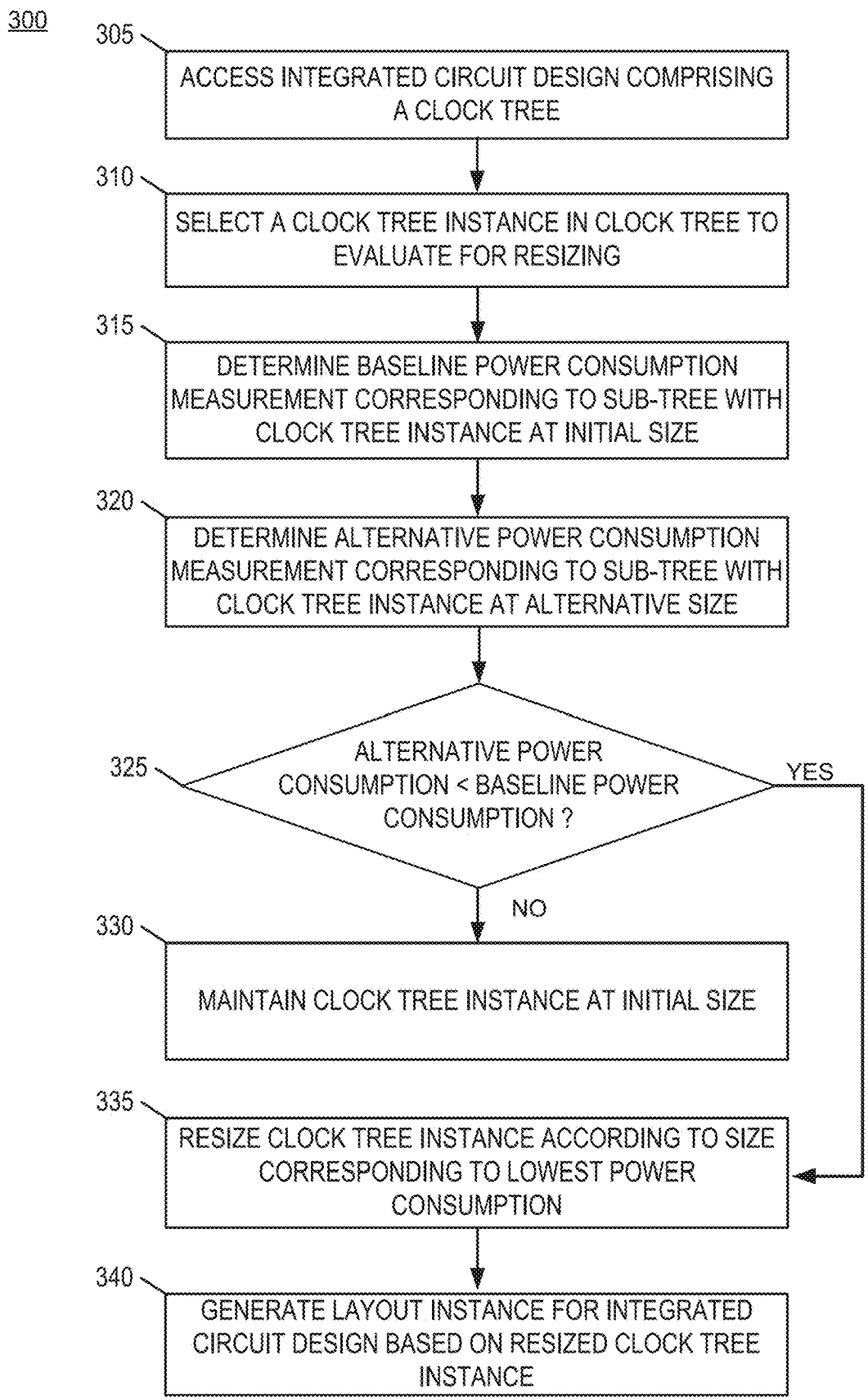
FIGS. 3 and 4 are flowcharts illustrating operations of a method for power-aware resizing of clock-tree instances, according to some example embodiments.
Figure 4:
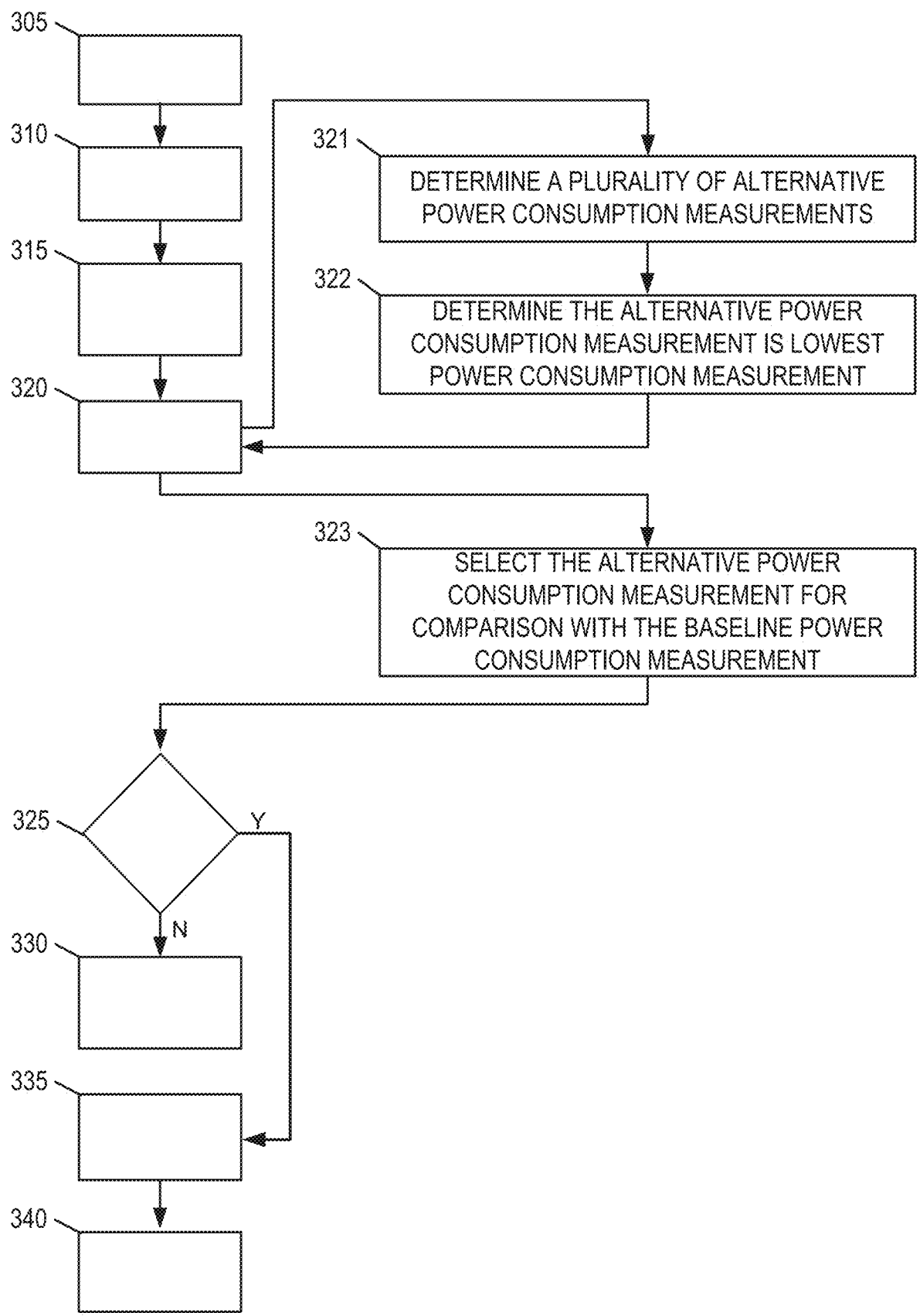

FIGS. 3 and 4 are flowcharts illustrating operations of a method 300 for power-aware resizing of clock-tree instances, according to some example embodiments. For some embodiments, the method 300 is performed as part of a CTS process applied to a circuit design (e.g., by an EDA software system).

It will be understood that the method 300 may be performed by a device, such as a computing device executing instructions of an EDA software system. For instance, the operations of the method 300 may be represented by executable instructions (e.g., EDA software) that, when executed by a processor of a computing device, cause the computing device to perform the method 300. Thus, an operation of the method 300 may be performed by a hardware processor (e.g., central processing unit or graphics processing unit) of a computing device (e.g., desktop, server, etc.). Accordingly, the method 300 is described below with reference to such a computing device.

The method 300 as illustrated begins at operation 305 where the computing device accesses an integrated circuit design stored in memory. The integrated circuit design comprises a clock tree comprising one or more routes that interconnect a plurality of clock tree instances. At least some portions of the clock-tree may be constructed using the Steiner-tree approach, as described above. As will be discussed below, the method 200 may be iteratively repeated for each clock-tree instance in the clock tree, in which case, the clock tree accessed at operation 205 may, in some instances, be a clock tree that is a modified version of a clock tree that was accessed in a previous iteration of the method 200 at operation 205

At operation 310, the computing device selects a clock-tree instance in the clock tree to evaluate for resizing. The clock-tree instance may correspond to a clock inverter, buffer, or gate. Initially, the clock-tree instance is included in the clock tree at an initial size (e.g., a first size), though the clock-tree instance may be available in one or more alternative sizes.

In some embodiments, the clock-tree instance may be selected based on a position of the clock-tree instance in the clock tree. For example, as noted above, a top-down search of the clock tree may be performed to evaluate each clock-tree instance for resizing. Hence, the position of each clock-tree instance in the clock tree determines an order in which the clock-tree instances are evaluated as the clock tree is traversed. In this example, initially a clock-tree instance corresponding to a root node of the clock tree is selected at operation 310. In subsequent iterations, the computing device selects downstream clock-tree instances in the clock tree to evaluate for resizing in a top-down, left-to-right manner.

In some embodiments, the clock-tree instance may be selected based on user input. For example, the computing device may provide a user interface to a user that allows a user to select a clock-tree instance to evaluate for resizing.

At operation 315, the computing device determines a baseline power consumption measurement corresponding to a sub-tree of the clock-tree instance based on an initial size of the clock-tree instance. That is, the baseline power consumption measurement is a measurement of the total power consumed by the sub-tree based on the initial size of the clock-tree instance. The sub-tree of the clock-tree instance comprises the clock-tree instance and any clock-tree instances connected either directly or indirectly to the clock-tree instance. As will be discussed below, the computing device determines the baseline power consumption measurement based on a leakage, switching, and internal power consumption of the sub-tree with the clock-tree instance at the initial size.

At operation 320, the computing device determines an alternative power consumption measurement corresponding to the sub-tree of the clock-tree instance based on an alternative size of the clock-tree instance (e.g., a second size). That is, the alternative power consumption measurement is a measurement of total power consumed by the sub-tree based on the alternative size of the clock-tree instance. As will be discussed further below, the computing device determines the alternative power consumption measurement based on a leakage power dissipation, switching power dissipation, and internal power consumption of the sub-tree with the clock-tree instance at the alternative size.

At operation 325, the computing device compares the alternative power consumption measurement with the baseline power consumption measurement. If, at operation 325, the computing device determines the alternative power consumption measurement is not less than the baseline power consumption measurement (e.g., the alternative power consumption measurement is equal to or greater than the baseline power consumption measurement), the computing device maintains the clock-tree instance at its initial size at operation 330.

On the other hand, if, at operation 325, the computing device determines the alternative power consumption is less than the baseline power consumption measurement, the computing device resizes the clock-tree instance according to the alternative size corresponding to the alternative power consumption measurement, at operation 335. That is, the computing device changes a size of the clock-tree instance from the initial size to the alternative size (e.g., from a first size to a second size). In resizing the clock-tree instance, the computing device may either downsize or upsize the clock-tree instance.

In some embodiments, prior to resizing the clock-tree instance according to the alternative size, the computing device may verify that the resizing of the clock-tree instance does not violate any design constraints such as skew, slew, and capacitance. If resizing the clock-tree instance would result in violation of any one of the design constraints, the computing device may maintain the clock-tree instance at its initial size or resize according to another alternative size that does not result in violation of a design constraint.

At operation 340, the computing device generates a layout instance for the integrated circuit design based on the resized clock-tree instance. The layout instance describes the physical layout dimensions of the integrated circuit design.

Depending on the embodiment, an operation of the method 300 may be repeated in different ways or involve intervening operations not shown. For example, the clock tree may be refined through one or more optimizations (e.g., wirelength reduction) after operation 335, but prior to generating the layout instance at operation 340. As another example, the method 300, or at least operations 305-335 of the method 300, may be repeated for each clock-tree instance in the clock tree. Thus, one or more additional clock-tree instances in the clock tree may be resized prior to generating the layout instance at operation 340. Further, though the operations of the method 300 may be depicted and described in a certain order, the order in which the operations are performed may vary among embodiments, including performing certain operations in parallel.

As shown in FIG. 4, the method 300 may, in some embodiments, further include operations 321, 322, and 323. Consistent with these embodiments, the operations 321 and 322 may be performed prior to or as part of (e.g., pre-cursor tasks, a sub-routine or sub-operations) of operation 320, where the computing device determines the alternative power consumption measurement.

At operation 321, the computing determines a plurality of alternative power consumption measurements for the sub-tree of the clock-tree instance. Each alternative power consumption measurement corresponds to one of a plurality of alternative sizes of the clock-tree instance. The plurality of alternative power consumption measurements include the alternative power consumption measurement determined at operation 320, and the plurality of alternative sizes include the alternative size corresponding to the alternative power consumption measurement determined at operation 320. At operation 322, the computing device determines the alternative power consumption measurement is the lowest power consumption measurement in the plurality of power consumption measurements.

Consistent with these embodiments, the operation 323 may be performed subsequent to operation 320 where the computing device determines the alternative power measurement. At operation 323, the computing device selects the alternative power consumption measurement determined at operation 320 for comparison with the baseline power consumption measurement (performed at operation 325) based on the alternative power consumption measurement being the lowest alternative power consumption measurement.

Figure 5:
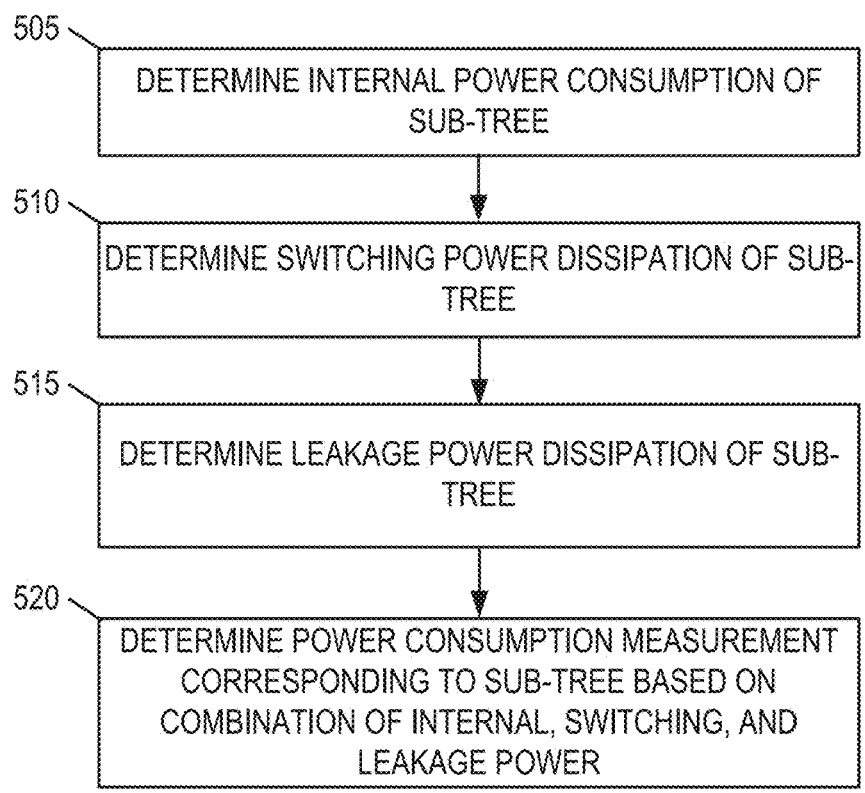
FIG. 5 is a flowchart illustrating operations of a method for determining a power consumption of a clock sub-tree, which may be performed as part of the method for power-aware resizing of clock tree instances, according to some example embodiments.

FIG. 5 is a flowchart illustrating operations of a method 500 for determining a power consumption of a clock sub-tree, which may be performed as part of the method for power-aware resizing of clock-tree instances, according to some example embodiments. For some embodiments, the method 500 is performed as part of operations 315 and 320, though a different size of clock-tree instance is used in each of the determinations.

Accordingly, as with the method 300, it will be understood that the method 500 may be performed by a device, such as the computing device executing instructions of an EDA software system. For instance, the operations of the method 500 may be represented by executable instructions (e.g., EDA software) that, when executed by a processor of a computing device, cause the computing device to perform the method 500. Thus, an operation of the method 500 may be performed by a hardware processor (e.g., central processing unit or graphics processing unit) of a computing device (e.g., desktop, server, etc.). Accordingly, the method 500 is described below with reference to the computing device.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel.

At operation 505, the computing device determines an internal power consumption of a sub-tree of a clock-tree instance. One or more standard circuit cells may be used to implement the clock tree (e.g., during fabrication). For example, each clock-tree instance may be implemented with a standard circuit cell. A standard circuit cell includes circuitry (e.g., one or more transistors and interconnected structures) that provides a Boolean logic function (e.g., AND, OR, XOR, XNOR, or inverters) or a storage function (e.g., a flip-flop or latch). The circuitry inside each standard circuit cell consumes an amount of energy, which corresponds to the internal power consumption of the cell. Hence, in determining the internal power consumption of the sub-tree of the clock-tree instance, the computing device determines an amount of power internally consumed by each standard circuit cell that corresponds to the sub-tree of the clock-tree instance and determines a sum of the power consumed internally by the standard circuit cells.

At operation 510, the computing device determines a switching power dissipation of the sub-tree. Switching power is dissipated when charging or discharging internal and net capacitances. The computing device determines the switching power dissipation based on a total wirelength of the sub-tree and a size of the load being driven by the sub-tree. In determining the switching power dissipation, the computing device determines an effective capacitance of the sub-tree based on the total wirelength and load size and uses the effective capacitance in combination with a known supply voltage ($V_{dd}$) and a known clock frequency to determine the switching power dissipation.

At operation 515, the computing device determines a leakage power dissipation of the sub-tree. Leakage power dissipation corresponds to power consumed by unintended leakage that does not contribute to the function of the sub-tree. Leakage power dissipation is primarily the result of unwanted subthreshold current in a transistor channel when a transistor is turned off. Leakage power dissipation directly correlates to a size of the transistor, which corresponds to a size of the clock-tree instance. Hence, leakage power dissipation of the sub-tree varies with the size of the clock-tree instance being evaluated for resizing. The computing device determines the leakage power dissipation based on a supply voltage $V_{dd}$, a switching threshold voltage $V_{th}$, and a transistor size (e.g., width divided by length). As noted above, the transistor size corresponds to the size of the clock-tree instance. Hence, the computing device determines the leakage power dissipation based on the supply voltage, the switching threshold voltage, and the size of the clock-tree instance (e.g., an initial size or an alternative size, depending on the power measurement being determined—baseline versus alternative).

At operation 520, the computing device determines a power consumption measurement corresponding to the sub-tree based on a combination of the internal power consumption, switching power dissipation, and leakage power dissipation. For example, in determining the power consumption measurement, the computing device may determine a sum of the internal power consumption, switching power dissipation, and leakage power dissipation.

Figure 6:
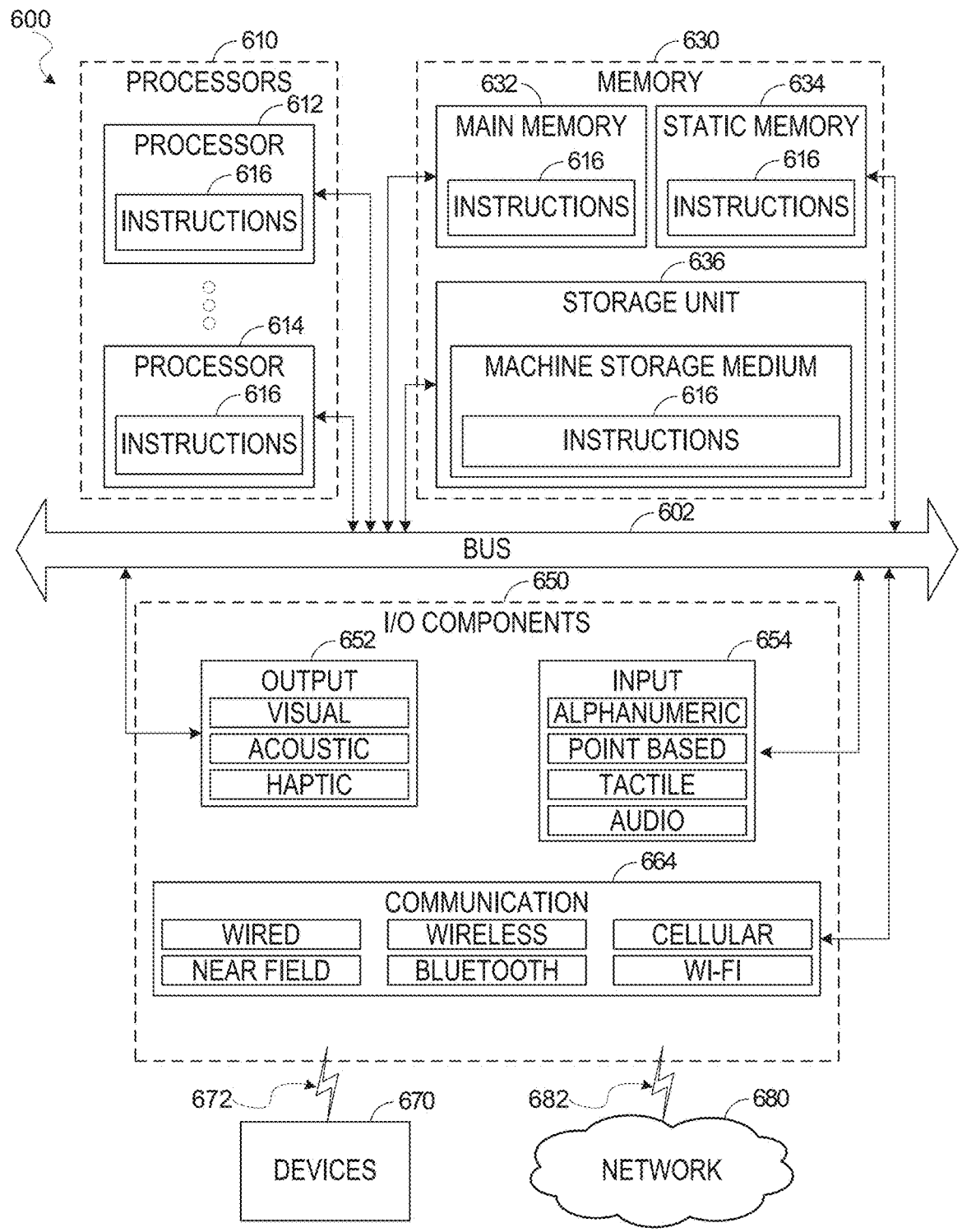
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute an EDA software system that executes any one or more of the methods 300 and 500. Additionally, or alternatively, the instructions 616 may implement FIGS. 1 and 2A-2D. The instructions 616 transform the general, non-programmed machine 600 into a particular machine 600 programmed to carry out the described and illustrated functions in the manner described here. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components (NFC, Bluetooth, and Wi-Fi) to provide communication via other modalities. The devices 670 may be another machine or any of a wide variety of peripheral devices (e.g., a peripheral device coupled via a universal serial bus (USB)).

Executable Instructions and Machine-Storage Medium

The various memories (e.g., 630, 632, 634, and/or memory of the processor(s) 610) and/or the storage unit 636 may store one or more sets of instructions and data structures (e.g., software) embodying or utilized by any one or more of the methodologies or functions described herein. These instructions (e.g., the instructions 616), when executed by the processor(s) 610, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which, when executed by the machine, cause the machine to perform operations comprising:
accessing an integrated circuit design stored in memory, the integrated circuit design comprising a clock tree comprising routes that interconnect a plurality of clock-tree instances;
selecting, from the plurality of clock-tree instances of the clock tree, a first clock-tree instance to evaluate for resizing, the first clock-tree instance initially being of a first size;
determining a baseline power consumption measurement corresponding to a sub-tree of the first clock-tree instance with the first size of the first clock-tree instance, the determining of the baseline power consumption measurement comprising determining a sum of a first internal power consumption, a first switching power dissipation, and a first leakage power dissipation corresponding to the sub-tree of the first clock-tree instance with the first size of the first clock-tree instance;
determining an alternative power consumption measurement corresponding to the sub-tree of the first clock-tree instance with a second size of the first clock-tree instance, the determining of the alternative power consumption measurement comprising determining a sum of a second internal power consumption, a second switching power dissipation, and a second leakage power dissipation corresponding to the sub-tree of the first clock-tree instance with the second size of the first clock tree instance;
based on determining that the alternative power consumption measurement is less than the baseline power consumption measurement, upsizing the first clock-tree instance in the clock tree from the first size to the second size;
selecting a second clock-tree instance in the clock tree to evaluate for resizing based on a position of the second clock-tree instance in the clock tree relative to a position of the first clock tree instance in the clock tree:
downsizing the second clock-tree instance in the clock tree in response to determining that downsizing the second clock-tree instance results in a reduction of power consumption in a sub-tree of the second clock-tree instance;
and
generating a layout instance for the integrated circuit design based on the upsized first clock-tree instance and the downsized second clock-tree instance, the layout instance describing physical layout dimensions of the integrated circuit design.

2. The system of claim 1, wherein the operations further comprise:
determining a plurality of alternative power consumption measurements corresponding to the sub-tree of the first clock-tree instance, each alternative power consumption measurement corresponding to one of a plurality of alternative sizes of the first clock-tree instance, the plurality of alternative power consumption measurements including the alternative power consumption measurement, the plurality of alternative sizes including the second size;
determining that the alternative power consumption measurement is the lowest power consumption measurement of the plurality of power consumption measurements; and
based on determining that the alternative power consumption measurement is the lowest power consumption measurement of the plurality of power consumption measurements, selecting the alternative power consumption measurement for comparison with the baseline power consumption measurement.

3. The system of claim 1, wherein the determining of the alternative power consumption measurement comprises:
determining the internal power consumption of the sub-tree of the first clock-tree instance with the second size of the first clock-tree instance;
determining the switching power dissipation of the sub-tree of the first clock-tree instance with the second size of the first clock-tree instance; and
determining the leakage power dissipation of the sub-tree of the first clock-tree instance with the second size of the first clock-tree instance.

4. The system of claim 1, wherein:
the determining of the internal power consumption of the sub-tree of the first clock-tree instance is based on a total power consumed by each cell in the sub-tree;
the determining of the switching power dissipation of the sub-tree of the first clock-tree instance is based on a total wirelength of the sub-tree and a load size driven by the sub-tree; and
the determining of the leakage power dissipation of the sub-tree of the first clock-tree instance is based on a supply voltage, a switching threshold voltage, and size of the first clock tree instance.

5. The system of claim 1, wherein the selecting of the first clock-tree instance is based on user input.

6. The system of claim 1, wherein;
the first clock tree instance is a root node of the clock tree,
the second clock-tree instance is a downstream clock-tree instance of the root node, and
the second clock-tree instance is selected to evaluate for resizing based on the second clock-tree instance being a downstream clock-tree instance of the root node.

7. A method comprising:
accessing an integrated circuit design stored in memory, the integrated circuit design comprising a clock tree comprising routes that interconnect a plurality of clock-tree instances;
determining, by at least one hardware processor, a baseline power consumption measurement corresponding to a sub-tree of a first clock-tree instance from among the plurality of interconnected clock tree instances, the baseline power consumption measurement corresponding to a first size of the first clock tree instance, the determining of the baseline power consumption measurement comprising determining a sum of a first internal power consumption, a first switching power dissipation, and a first leakage power dissipation corresponding to the sub-tree of the first clock-tree instance with the first size of the first clock-tree instance;
determining, by the at least one hardware processor, an alternative power consumption measurement corresponding to the sub-tree with the first clock-tree instance at a second size, the determining of the alternative power consumption measurement comprising determining a sum of a second internal power consumption, a second switching power dissipation, and a second leakage power dissipation corresponding to the sub-tree of the first clock-tree instance with the second size of the first clock tree instance;
comparing the alternative power consumption measurement to the baseline power consumption measurement;
based on determining the alternative power consumption measurement is less than the baseline power consumption measurement, upsizing, by the at least one hardware processor, the first clock-tree instance in the clock tree according to the second size;
selecting a second clock-tree instance in the clock tree to evaluate for resizing based on a position of the second clock-tree instance in the clock tree relative to a position of the first clock tree instance in the clock tree:
downsizing the second clock-tree instance in the clock tree in response to determining that downsizing the second clock-tree instance results in a reduction of power consumption in a sub-tree of the second clock-tree instance; and
generating a layout instance for the integrated circuit design based on the upsized first clock-tree instance and the downsized second clock-tree instance, the layout instance describing physical layout dimensions of the integrated circuit design.

8. The method of claim 7, further comprising:
determining a plurality of alternative power consumption measurements corresponding to the sub-tree of the first clock tree instance, each alternative power consumption measurement corresponding to one of a plurality of alternative sizes of the first clock-tree instance, the plurality of alternative power consumption measurements including the alternative power consumption measurement, the plurality of alternative sizes including the second size;
determining that the alternative power consumption measurement is the lowest power consumption measurement of the plurality of power consumption measurements; and
based on determining that the alternative power consumption measurement is the lowest power consumption measurement of the plurality of power consumption measurements, selecting the alternative power consumption measurement for comparison with the baseline power consumption measurement.

9. The method of claim 7, wherein the determining of the alternative power consumption measurement comprises:
determining the internal power consumption of the sub-tree of the first clock-tree instance with the second size of the first clock-tree instance;
determining the switching power dissipation of the sub-tree of the first clock-tree instance with the second size of the first clock-tree instance; and
determining the leakage power dissipation of the sub-tree of the first clock-tree instance with the second size of the first clock-tree instance.

10. The method of claim 7, wherein:
the determining of the internal power consumption of the sub-tree of the first clock-tree instance is based on a total power consumed by each cell in the sub-tree;
the determining of the switching power dissipation of the sub-tree of the first clock-tree instance is based on a total wirelength of the sub-tree and a load size driven by the sub-tree; and the determining of the leakage power dissipation of the sub-tree of the first clock-tree instance is based on a supply voltage, a switching threshold voltage, and size of the first clock tree instance.

11. The method of claim 7, wherein the identifying of the first clock-tree instance is based on user input.

12. The method of claim 7, wherein;
the first clock tree instance is a root node of the clock tree,
the second clock-tree instance is a downstream clock-tree instance of the root node, and
the second clock-tree instance is selected to evaluate for resizing based on the second clock-tree instance being a downstream clock-tree instance of the root node.

13. A computer storage medium storing instructions, which when executed by a machine, cause the machine to perform operations comprising:
accessing an integrated circuit design stored in memory, the integrated circuit design comprising a clock tree comprising routes that interconnect a plurality of clock-tree instances;
selecting, from among the plurality of clock-tree instances of the clock tree, a first clock-tree instance to evaluate for resizing, the first clock-tree instance initially being of a first size;
determining a baseline power consumption measurement corresponding to a sub-tree of the first clock-tree instance, with the first clock-tree instance at the first size, the determining of the baseline power consumption measurement comprising determining a sum of a first internal power consumption, a first switching power dissipation, and a first leakage power dissipation corresponding to the sub-tree of the first clock-tree instance with the first size of the first clock-tree instance;
determining a plurality of alternative power consumption measurements corresponding to the sub-tree of the first clock-tree instance, each alternative power consumption measurement corresponding to one of a plurality of alternative sizes of the first clock-tree instance, the determining of the plurality of alternative power consumption measurements comprising determining an alternative power consumption measurement corresponding to the sub-tree with the first clock-tree instance at a second size, the determining of the alternative power consumption measurement comprising determining a sum of a second internal power consumption, a second switching power dissipation, and a second leakage power dissipation corresponding to the sub-tree of the first clock-tree instance with the second size of the first clock tree instance;
determining a lowest alternative power consumption measurement of the plurality of alternative power consumption measurements, the lowest alternative power consumption measurement corresponding to the second size of the first clock-tree instance;
comparing the lowest alternative power consumption measurement with the baseline power consumption measurement;
based on determining that the lowest alternative power consumption measurement is less than the baseline power consumption measurement, upsizing the first clock-tree instance in the clock tree from the first size to the second size;
selecting the second clock-tree instance in the clock tree to evaluate for resizing based on a position of the second clock-tree instance in the clock tree relative to a position of the first clock tree instance in the clock tree:
downsizing a second clock-tree instance in the clock tree in response to determining that downsizing the second clock-tree instance results in a reduction of power consumption in a sub-tree of the second clock-tree instance; and
generating a layout instance for the integrated circuit design based on the upsized first clock-tree instance and the downsized second clock-tree instance, the layout instance describing physical layout dimensions of the integrated circuit design.

14. The computer storage medium of claim 13, wherein the determining of the alternative power consumption measurement comprises:
determining the internal power consumption of the sub-tree of the first clock-tree instance with the second size of the first clock-tree instance;
determining the switching power dissipation of the sub-tree of the first clock-tree instance with the second size of the first clock-tree instance; and
determining the leakage power dissipation of the sub-tree of the first clock-tree instance with the second size of the first clock-tree instance.

15. The computer storage medium of claim 13, wherein:
the determining of the internal power consumption of the sub-tree of the first clock-tree instance is based on a total power consumed by each cell in the sub-tree;
the determining of the switching power dissipation of the sub-tree of the first clock-tree instance is based on a total wirelength of the sub-tree and a load size driven by the sub-tree; and
the determining of the leakage power dissipation of the sub-tree of the first clock-tree instance is based on a supply voltage, a switching threshold voltage, and size of the first clock tree instance.

16. The computer storage medium of claim 13, wherein the selecting of the first clock-tree instance is based on user input.

17. The computer storage medium of claim 13, wherein:
the first clock tree instance is a root node of the clock tree,
the second clock-tree instance is a downstream clock-tree instance of the root node, and
the second clock-tree instance is selected to evaluate for resizing based on the second clock-tree instance being a downstream clock-tree instance of the root node.

* * * * *